Patented Nov. 23, 1943

2,334,695

UNITED STATES PATENT OFFICE 2,334,695

17-HYDROXY-3-KETO-COMPOUNDS OF THE CYCLOPENTANO POLYHYDROPHENAN-THRENE SERIES AND A METHOD FOR PRODUCING THE SAME

Adolf Butenandt, Danzig-Langfuhr, Free State of Danzig, and Lothar Strassberger, Berlin-Wilmersdorf, Germany, assignors, by mesne assignments, to Schering Corporation, Bloomfield, N. J., a corporation of New Jersey No Drawing. Application August 29, 1936, Serial No. 98,618. In Germany August 30, 1935

8 Claims. (Cl. 260—397.4)

The present invention relates to 17-hydroxy-3-keto-compounds of the cyclopentano polyhydrophenanthrene series and more especially to a method of transforming 3,17-diole-compounds of the cyclopentano polyhydrophenanthrene series into 17-hydroxy-3-keto-compounds.

The process according to the present invention consists in subjecting 3,17-diole-compounds of the cyclopentano polyhydrophenanthren series, wherein the hydroxyl group at the carbon atom-3 is left free, to the action of agents capable of transforming a secondary alcohol group into a keto group.

As starting materials for the process of the present invention saturated as well as unsaturated diole-compounds of the cyclopentano polyhydrophenanthren series may be used, especially the diole-compounds of the $C_{19}$-series, which may possess instead of the hydrogen atom a hydrocarbon radical at the carbon atom 17, such as compounds of the type of the oestrandioles-3,17, alkyl-oestran-dioles-3,17, androstan-dioles-3,17, alkyl-androstan-dioles-3,17, androsten-dioles-3,17, alkyl-androsten-dioles-3,17.

If unsaturated compounds are used as starting materials it is advisable to protect the carbon to carbon double bonds against the action of the oxidising agents, for instance, by intermediary addition of halogen or halogen hydride to the carbon to carbon double bond. The hydroxyl group at the carbon atom 17 may be left free especially when at the carbon atom 17 besides the hydroxyl group a hydro-carbon radical is present; the hydroxyl group, however, may also be transformed, for instance, by esterfication, etherfication, halogenation and so on, into a group that can be reconverted into a hydroxyl group by hydrolysis or similar treatment. Such 3,17-diole-compounds wherein the hydroxyl group at the carbon atom 17 is replaced by a substituent can, for instance, be prepared according to the process of our copending application Ser. No. 98,617 filed simultaneously herewith.

In order to isolate the hydroxy-keto-compound from the reaction mixture the usual methods of fractional crystallisation, distillation or sublimation may be employed. Furthermore the hydroxy-keto-compounds formed may be separated from the oxidation mixture by means of keto reagents and/or by means of acylating agents capable of yielding difficultly soluble esters; of especial value has proved the use of saponines, such as digitonine, for the separation of the non-reacted diole-compounds as the latter, especially if they have been used in the form of their 17-derivatives, by this manner can directly be employed for a new reaction set.

The 17-hydroxy-3-keto-compounds obtainable according to the process of the present invention are physiologically valuable substances; they are either themselves physiologically active or can be transformed into physiologically active compounds. Thus, for instance, the androstenol-17-one-3 possesses a physiological activity which is 40 times as high as the physiological activity of the androstendiole-3,17 used as starting material. Similar results are obtained in the cases of the derivatives wherein the hydroxyl group at the carbon atom 17 is substituted by esterfication, etherfication, halogenation and so on. These 17-derivatives can also be prepared by subsequent esterfication, etherfication, halogenation or similar treatment of the free hydroxy ketones. Of special value has proved, for instance, the 17-benzoate of the androstenol-17-one-3, of the so called testosterone.

The process of the present invention may be further illustrated, for instance, by the following structural formulas, wherein X represents a hydroxyl group or a group reconvertible into the hydroxyl group by hydrolysis or similar treatment and R stands for hydrogen or a hydrocarbon radical, whereas MN means halogen or halogen hydride.

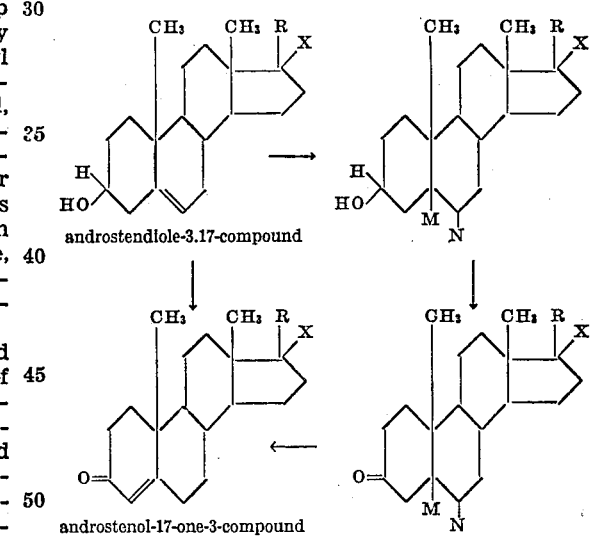

androstendiole-3.17-compound androstenol-17-one-3-compound

The following examples serve to illustrate the invention without, however, limiting the same to them:

Example 1

84.7 mg. of androstendiol-monoacetate-17 (M. P. 144–146° C.) are dissolved in 15 ccs. of glacial acetic acid, brominated with 42.8 mg. of bromine in 1.4 ccs. of glacial acetic acid, treated with 26.8 mg. of chromium trioxide in 11 ccs. of glacial acetic acid and allowed to stand for 15 hours. Subsequently the whole is poured into water and extracted with ether. The ether is washed consecutively with 2N caustic soda lye, dilute hydrochloric acid and water, dried and distilled off at room temperature.

The residue is dissolved in 50 ccs. of methanol, treated with 250 mg. of sodium iodide in 50 ccs. of methanol, heated to 35° C. for 1½ hours and subsequently boiled for ¾ hour. The hot solution is then poured into a solution containing 0.5 gram of sodium sulphite in 300 ccs. of water and extracted with ether. The ether is washed, dried and distilled off. On distillation of the residue in a high vacuum at 130–140° C. a distillate is obtained which crystallises in needles. After recrystallisation from dilute methanol a product of M. P. 125–128° C., is obtained whereas on the application of dilute ethyl-alcohol as solvent there is produced a product of M. P. 134–135° C.

From this acetate by saponification a ketone alcohol of melting point 151° C. is obtained in the form of dense needles which possess an optical rotation $[\alpha]_D^{18°} = +109°$ and after treatment with hydroxylamine gives an oxime of M. P. 221° C. The ketone-alcohol of M. P. 151° C. shows an activity of 10–20γ per capon unit.

Example 2

103 mg. of androstendiol-monoacetate-17 (M. P. 144–146° C.) are dissolved in 15 ccs. of glacial acetic acid, brominated with 50 mg. of bromine in 1.6 ccs. of glacial acetic acid, treated with 31 mg. of chromium trioxide and allowed to stand for 15 hours. Then the whole is poured into water and extracted with ether. The ethereal solution is washed consecutively with 1N caustic soda lye, dilute hydrochloric acid and water, dried over sodium sulphate and distilled off.

The residue is dissolved in 20 ccs. of glacial acetic acid and treated in portions while shaking with 1 gram of zinc dust, then heated for 10 minutes on a boiling waterbath and filtered from the zinc dust. The zinc dust is washed once with glacial acetic acid and three times with ether. The combined filtrates are poured into water and extracted with ether. The ether is consecutively washed with 1N caustic soda lye, dilute hydrochloric acid and water, dried and distilled off. A light yellow oil remains which distils in a high vacuum at 120° C. This oil is recrystallised twice from dilute acetone and thus yields needles of M. P. 131° C. and of M. P. 135–136° C. By saponification there is obtained therefrom the same ketone alcohol of M. P. 151° C. as described in Example 1. By interaction of this ketone alcohol with benzoyl chloride the corresponding 17-benzoic acid ester is obtained.

Example 3

3 grams of 17-methyl-androstandiol-3.17 are treated in 120 ccs. of glacial acetic acid with stirring and water cooling with a solution of 0.8 gram of chromium trioxide in 2 ccs. of water and 20 ccs. of glacial acetic acid. The mixture is allowed to stand at room temperature for about 12 hours. Thereupon the reaction mixture is poured into water, extracted with ether and the ether solution dried. After evaporation of the ether there remains the 17-methyl-androstanol-17-one-3, which can obtained in colourless prisms on recrystallisation from dilute alcohol or ethyl acetate.

Example 4

To a solution of 3 grams of 17-methyl-androstendiol-3.17 in 120 ccs. of glacial acetic acid is added with stirring a solution of 1.6 grams of bromine in 20 ccs. of glacial acetic acid. After decolorisation of the bromine solution there is added with stirring and water cooling a solution of 0.8 gram of chromium trioxide in 2 ccs. of water and 20 ccs. of glacial acetic acid and the reaction mixture is allowed to stand for about 12 hours at room temperature. The whole is poured into water, extracted with ether and the ether solution dried. After the addition of 8 grams of zinc dust and 100 ccs. of glacial acetic acid the ether is distilled off and the remaining solution after the introduction of a further 8 grams of zinc dust thoroughly stirred for a further half an hour at 50° C. The whole is filtered with suction from the zinc dust, poured into water, extracted with ether and the ethereal solution freed from acid with 2N caustic soda lye. The ether is dried and evaporated; the residue yields on recrystallisation from dilute alcohol or ether colourless needles.

Example 5

A solution of 0.8 gr. of 3-hydroxy-17-chlorandrostene in 60 ccs. glacial acetic acid is mixed while shaking with a solution of 0.414 gr. of bromine in 20 ccs. glacial acetic acid. Thereto 259 mg. of chromic acid anhydride in 20 ccs. glacial acetic acid are added. The reaction mixture is allowed to stand for 48 hours and the reaction product is debrominated while cooling with 2 grams zinc dust for 8 hours. The solution is then filtered off from zinc dust, poured into water and extracted with ether. The ethereal solution is washed with alkaline lye and water and evaporated to dryness. The residue of the ethereal solution contains 0.7 gram of 17-chlor-androstenone-3.

Example 6

Androstendiole-3.17 is dissolved in glacial acetic acid and 1 mol of bromine is added to the glacial acetic acid solution. The dibromide formed is precipitated by the addition of water and purified by recrystallisation from acetic acid ester; on heating it is decomposed at about 96° C.

The dibromide is dissolved or suspended by shaking in 200 times the amount of glacial acetic acid. Thereafter a solution of chromic acid anhydride in glacial acetic acid (corresponding to 1.2 atom of oxygen) is added. The chromic acid anhydride is soon used up; now zinc dust in twice the amount of dibromide is added and the reaction mixture is stirred in the water bath for 1 hour. After filtering off the zinc dust the mixture is poured into water and the reaction product is taken up with ether. The ethereal solution is washed with diluted sodium carbonate solution and with water and evaporated to dryness. The residue is dissolved in alcohol and the solution while hot mixed with a solution of digitonine in methyl-alcohol; the digitonide of the dehydroandrosterone formed in the oxidation-process is obtained. The solution left after filtering the digitonide-precipitate is evaporated to dryness and the residue extracted with ether. From the ethereal solution by evaporation the other part of the oxidation product is obtained wherefrom by means of phthalic acid anhydride the corresponding ester of testosterone, and androstenol-17-one-3, can be isolated. By saponification of the ester, free testosterone is obtained.

Example 7

400 mg. iso-androstandiol-monoacetate-17 obtained from iso-androstandiol-diacetate of the M. P. 123–124° C. after standing for 24 hours in 300 ccs. 0.3% methyl alcoholic potassium hydroxide solution are dissolved in 30 ccs. glacial acetic acid and oxidized by means of 140 mg. chromic acid anhydride at room temperature during 24 hours. The reaction products precipitated by the addition of water are filtered off and brought into reaction with semicarbazide acetate solution in alcohol. The semicarbazone is isolated and split with alcoholic sulfuric acid; the ketone-fraction obtained is hydrolised by warming with 3N methylalcoholic potassium hydroxide solution. About 100 mg. of androstanol-17-one-3 are obtained which can be recrystallised from diluted alcohol and diluted acetone. The hydroxyketone has a M. P. of 178° C.; the optical rotation $[\alpha]_D^{20°}$ amounts to +32.4° (in alcohol). Its acetate melts at 157° C. and its oxime at 209° C.

Example 8

1.02 gram iso-androstandiol-monoacetate-17 are allowed to stand in 132 ccs. glacial acetic acid containing 310 mg. chromic acid anhydride for 24 hours. The reaction mixture is diluted with water and extracted with ether. The ethereal solution is evaporated to dryness and the residue recrystallised from dilute acetone. The yield amounts to 830 mg. of androstanol-17-one-3 acetate of the M. P. 156–157° (82% of the theoretical yield).

830 mg. of androstanol-17-one-3 acetate are dissolved in 230 ccs. methyl alcoholic potassium hydroxide solution and heated to boiling for 30 minutes; the reaction mixture is diluted with water, neutralised with diluted hydrochloric acid and extracted with ether. The residue of the ethereal solution is recrystallised from diluted acetone and acetone-petrolether. 570 mg. of androstanol-17-one-3 of the M. P. 176° C. are obtained.

Example 9

4 gr. of iso-androstandiole-monobenzoate-17 are dissolved in 200 ccs. glacial acetic acid and oxidised with 1.2 gr. of chromic acid anhydride at room temperature for 30 hours. The reaction mixture is poured into water, several times extracted with ether the ethereal solution washed with alkaline lye and water, whereafter it is freed from water and evaporated to dryness. On recrystallising the residue of the ethereal solution from diluted ethyl-alcohol the benzoate of the androstanol-17-one-3 of the M. P. 200° C. is obtained.

Example 10

400 mg. of 17-ethyl-androstendiole-3,17 are dissolved in 15 ccs. glacial acetic acid and to the cooled solution the amount of bromine in about 1 cc. of glacial acetic acid is added which corresponds to 1 mol of the diole; then the amount of chromic acid anhydride in about 7 ccs. of glacial acetic acid is added which corresponds to 3 equivalents of oxygen. After 15 hours the reaction product is precipitated with water and filtered off. In order to debrominate the reaction product it is warmed with 1 gram zinc dust in 15 ccs. methanol for about 20 minutes; thereafter the reaction product is precipitated by the addition of water and filtered off; it is purified and recrystallised from acetone, diluted acetone and finally from ethyl-acetate. The $\Delta_{5,6}$-17-ethyl-androstenol-17-one-3 is obtained in the form of well shaped needles of the M. P. 149° C. The crystals commence to sinter on slowly warming at about 144° C. The yield amounts to 200 mg. The optical rotation in absolute alcohol $[\alpha]_D^{20}$ equals to −35.3°. The semicarbazone melts at 210° C.

Example 11

100 mg. of $\Delta_{5,6}$-17-ethyl-androstendiole-3,17 are dissolved in 8 ccs. of glacial acetic acid and mixed with an amount of bromine corresponding to 1 mol of the diole and with an amount of chromic acid anhydride in glacial acetic acid corresponding to 2 equivalents of oxygen. After the reaction mixture has been kept in the cold for 14 hours the reaction product is precipitated with water and after being filtered off is warmed in 4 ccs. methanol with 150 mg. zinc dust in the presence of 0.3 cc. of 4N sulfuric acid or a drop of 48% hydrobromic acid to gentle boiling for 10 minutes. The zinc dust is filtered off and the filtrate precipitated with water and extracted with ether. The ethereal solution is successively washed with dilute sodium hydroxide solution, with dilute sulfuric acid and water. After evaporating the ether 40 mg. of crude product are obtained wherefrom on recrystallisation from petrol-ether the $\Delta_{4,5}$-17-ethyl-androstenol-17-one-3 in the form of small needles of the M. P. 139° C. is obtained. The semicarbazone formed by the addition of semicarbazide-acetate in alcoholic solution melts at 230° C. with decomposition.

Example 12

3,5 grams 17-methyl-androstandiol-3,17-monoacetate-17 are dissolved in 100 ccs. glacial acetic acid and thereto a solution of 1.3 grams of chromic acid anhydride in 20 ccs. of 90% acetic acid is added at room temperature. After the reaction mixture has been allowed to stand for 1 day it is poured into water and extracted with ether. The ethereal solution is washed with alkaline lye and water, freed from water, and evaporated to dryness. On recrystallising the residue from diluted alcohol the acetate of the 17-methyl-androstanol-17-one-3 is obtained.

Example 13

3 gr. of androstendiole-monobenzoate-17 are dissolved in 450 ccs. of glacial acetic acid and thereto a solution of 1.22 grams of bromine in 25 ccs. of glacial acetic acid and a solution of 0.75 gram of chromic acid anhydride in 30 ccs. of glacial acetic acid are added successively while stirring and cooling. After allowing the reaction mixture to stand for 2 days at room temperature 30 grams of zinc dust are added and the whole is stirred for 2 to 3 hours at 15–20° C. and finally 10 to 15 minutes at about 100° C. The solution is filtered off from the zinc dust, poured into water, and extracted with ether for several times. The united ethereal solutions are washed with sodium carbonate solution and water, freed from water and evaporated to dryness. On recrystallising the residue from methanol the androstenol-17-one-3-benzoate-17 is obtained. The benzoate is hydrolised by boiling with 1N methyl alcoholic potassium hydroxide solution, whereafter the hydrolising solution is diluted with water and extracted with ether. By evaporating the ether a residue is obtained which yields on recrystallisation from diluted acetone needles of the M. P. 151° C. and the optical rotation of $[\alpha]_D^{18}$ of $+104°$ in alcohol. The maximum of the absorption is situated at 23- m$\mu$; the product forms an oxime of the M. P. 215° C. and corresponds to the testosterone of the formula $C_{19}H_{28}O_2$ obtained from bull testicles.

Instead of the 17-acyl-derivatives also the 17-ether-derivatives of the diols may be used as starting materials, such as, for instance, triphenylmethylether or other alkoxy, aroxy or aralkoxy derivatives.

Various other modifications in the process as regards reagents may be resorted to within the scope of the appended claims without departing from the principles set forth herein.

What we claim is:

1. The compounds of the formula

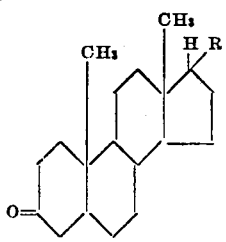

wherein R is an etherified hydroxyl group.

2. A 10,13-dimethyl cyclopentanopolyhydrophenanthrene compound having a keto group in the 3-position and an etherified hydroxyl group in the 17-position.

3. The compounds of the formula

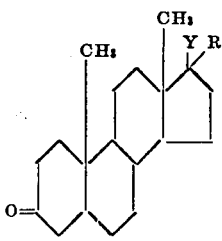

wherein R is an etherified hydroxyl group and Y is an alkyl group.

4. Method for the production of 17-hydroxy-3-keto compounds of the cyclopentano polyhydrophenanthrene series, comprising subjecting a compound of the cyclopentano polyhydrophenanthrene series of the general formula $$C_{19}H_nR_1R_2X$$

wherein $n$ stands for an even number from 26 to 28, inclusive, and $R_1$ represents a free secondary alcoholic group at the carbon atom 3, whereas $R_2$ is at the 17-position and stands for a member of the group consisting of a hydroxyl group and groups that can be transformed into a hydroxyl group, while X is likewise at the 17-position and indicates a member of the group consisting of hydrogen and hydrocarbon radicals, to the action of an oxidizing agent capable of transforming a secondary alcoholic group into a keto group, the carbon-to-carbon double bond of an unsaturated hydroxy starting compound being protected against the action of the oxidizing agent by intermediary addition of halogen hydride to saturate such double bond.

5. Method for the production of 17-hydroxy-3-keto compounds of the cyclopentano polyhydrophenanthrene series, comprising subjecting a compound of the cyclopentano polyhydrophenanthrene series of the general formula $$C_{19}H_nR_1R_2X$$

wherein $n$ stands for an even number from 26 to 28, inclusive, and $R_1$ represents a free secondary alcoholic group at the carbon atom 3, whereas $R_2$ is at the 17-position and stands for a member of the group consisting of a hydroxyl group and groups that can be transformed into a hydroxyl group, while X is likewise at the 17-position and indicates a member of the group consisting of hydrogen and hydrocarbon radicals, to the action of an oxidizing agent capable of transforming a secondary alcoholic group into a keto group, and purifying the hydroxy keto compound formed with the aid of a saponine.

6. Method according to claim 5, wherein the saponine is digitonine.

7. The compounds of the formula

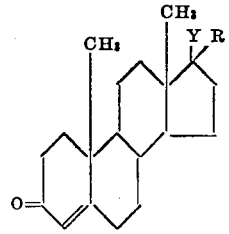

wherein R is an etherified hydroxyl group and Y is an alkyl group.

8. Compounds as defined in claim 7, wherein Y is methyl.

ADOLF BUTENANDT.
LOTHAR STRASSBERGER.